US007225362B2

(12) United States Patent
Deily et al.

(10) Patent No.: US 7,225,362 B2
(45) Date of Patent: May 29, 2007

(54) ENSURING THE HEALTH AND AVAILABILITY OF WEB APPLICATIONS

(75) Inventors: Eric D. Deily, Redmond, WA (US); Asim Mitra, Andhra Pradesh (IN); Seth B. Pollack, Seattle, WA (US); Charles K. Moore, Fort Worth, TX (US); Andy Morrison, Woodinville, WA (US); Rayner S. D'Souza, Seattle, WA (US); Douglas C. Hebenthal, Redmond, WA (US); Michael Courage, Kirkland, WA (US); Vasilios Karagounis, Roselands (AU); Emily Kruglick, Sammamish, WA (US); Wade Hilmo, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 10/377,148

(22) Filed: Feb. 28, 2003

(65) Prior Publication Data

US 2004/0034855 A1 Feb. 19, 2004

Related U.S. Application Data

(63) Continuation-in-part of application No. 09/878,950, filed on Jun. 11, 2001.

(60) Provisional application No. 60/366,795, filed on Mar. 22, 2002.

(51) Int. Cl.
  *G06F 11/00* (2006.01)
  *G06F 15/173* (2006.01)
  *G06F 9/46* (2006.01)
(52) U.S. Cl. ............... 714/38; 714/1; 714/2; 714/37; 714/47; 714/48; 714/100; 714/815; 709/223; 709/224; 718/102; 718/104

(58) Field of Classification Search ............... 718/102, 718/104; 709/223–224; 719/310; 714/1, 714/37–39, 47–48, 100, 815, 2
See application file for complete search history.

(56) References Cited

U.S. PATENT DOCUMENTS

| 5,146,593 | A |   | 9/1992  | Brandle et al.          |
|-----------|---|---|---------|-------------------------|
| 5,155,837 | A | * | 10/1992 | Liu et al. ...... 709/221 |
| 5,706,507 | A |   | 1/1998  | Schloss                 |
| 5,715,386 | A | * | 2/1998  | Fulton et al. ...... 714/38 |
| 5,918,226 | A |   | 6/1999  | Tarumi et al.           |
| 5,930,830 | A |   | 7/1999  | Mendelson et al.        |
| 6,098,064 | A |   | 8/2000  | Pirolli et al.          |
| 6,188,698 | B1|   | 2/2001  | Galand et al.           |

(Continued)

OTHER PUBLICATIONS

Li et al., "An Approach for Estimation of Software Aging in a Web Server," 2002, IEEE.*

(Continued)

*Primary Examiner*—Meng-Al T. An
*Assistant Examiner*—Qing-Yuan Wu
(74) *Attorney, Agent, or Firm*—Lee & Hayes, PLLC (57) ABSTRACT

A web server arrangement is provided having a kernel-mode listener service capable of receiving web requests and providing the web requests to at least one user mode web application. The listener service and the web application are operatively configured by a user-mode administrative process. The administrative process is configured to determine when a web application needs to be recycled and to selectively recycle web applications.

50 Claims, 6 Drawing Sheets

U.S. PATENT DOCUMENTS

| | | | |
|---|---|---|---|
| 6,219,760 B1 | 4/2001 | McMinn | |
| 6,223,202 B1 | 4/2001 | Bayeh | |
| 6,463,465 B1 | 10/2002 | Nieuwejaa | |
| 6,542,920 B1 | 4/2003 | Belkin et al. | |
| 6,574,712 B1 | 6/2003 | Kahle et al. | |
| 6,594,784 B1* | 7/2003 | Harper et al. | 714/47 |
| 6,622,168 B1 | 9/2003 | Datta | |
| 6,629,266 B1* | 9/2003 | Harper et al. | 714/38 |
| 6,732,138 B1 | 5/2004 | Browning et al. | |
| 6,810,495 B2* | 10/2004 | Castelli et al. | 714/47 |
| 6,820,215 B2* | 11/2004 | Harper et al. | 714/15 |
| 6,915,384 B2 | 7/2005 | Mitra et al. | |
| 6,978,398 B2* | 12/2005 | Harper et al. | 714/13 |
| 2002/0047899 A1 | 4/2002 | Son et al. | |
| 2002/0062372 A1 | 5/2002 | Hong et al. | |
| 2002/0069420 A1 | 6/2002 | Russell et al. | |
| 2002/0078174 A1 | 6/2002 | Sim et al. | |
| 2002/0087612 A1* | 7/2002 | Harper et al. | 709/100 |
| 2002/0087797 A1 | 7/2002 | Adrangi | |
| 2002/0120710 A1 | 8/2002 | Chintalapati et al. | |
| 2002/0129123 A1 | 9/2002 | Johnson et al. | |
| 2002/0147966 A1* | 10/2002 | Frazier | 717/127 |
| 2002/0152328 A1 | 10/2002 | Kagan et al. | |
| 2002/0161908 A1 | 10/2002 | Benitez et al. | |
| 2003/0061378 A1 | 3/2003 | Mazzitelli | |
| 2003/0079154 A1* | 4/2003 | Park et al. | 714/1 |
| 2003/0135464 A1 | 7/2003 | Mourad et al. | |

OTHER PUBLICATIONS

Mercer et al., Processor capacity reserves: an abstraction for managing processor usage, Workstation Operating sytems, 1993. Proceedings. Fourth Wordshop on, Oct. 14-15, 1993 pp. 129-134.

Zhou et al., Processor-pool-based scheduling for large-scale NUMA multiprocessors, Joint Internation Conference on Measurement and Modeling of Computer Systems, pp. 133-142, Year of Publication: 1991.

Tanenbaum, "Structured Computer Organization", Prentice-Hall Inc, 1984, pp. 1-5.

* cited by examiner

ENSURING THE HEALTH AND AVAILABILITY OF WEB APPLICATIONS

RELATED PATENT APPLICATIONS

This U.S. Patent Application is a Continuation-in-Part (CIP) application and claims the benefit of priority of co-pending U.S. patent application Ser. No. 09/878,950, filed Jun. 11, 2001.

This U.S. Patent Application further claims the benefit of priority from, and hereby incorporates by reference the entire disclosure of, co-pending U.S. Provisional Application for Letters Patent Ser. No. 60/366,795, filed Mar. 22, 2002, and titled "Methods And Systems For Ensuring Health And/Or Availability Of Web Applications".

This U.S. patent application is related to co-pending U.S. application for Letters Patent Ser. No. 10/377,175, filed Feb. 28, 2003, and titled "An Improved Web Server Architecture".

This U.S. patent application is related to co-pending U.S. application for Letters Patent Ser. No. 10/377,176, filed Feb. 28, 2003, and titled "Web Garden Application Pools Having a Plurality of User-Mode Web Applications".

TECHNICAL FIELD

The present invention relates generally to computers and like devices, and more particularly to methods, apparatuses and systems for maintaining the health and availability of web applications supported by a web server.

BACKGROUND

The popularity of the Internet, and in particular, the portion of the Internet known as the World Wide Web, continues to grow. The World Wide Web is basically a collection of computers that are operatively linked together through a plurality of communication networks. Typically, users access the World Wide Web through a personal computer or like device, which is connected to the Internet via a modem of some type. For example, many users of the World Wide Web connect to the Internet using a dial-up telephone networked modem configured to establish data communications through an Internet Services Provider (ISP). Other users connect to the Internet with a faster modem, e.g., a cable modem, digital subscriber line (DSL) modem, etc.

Regardless of how a user ultimately connects to the Internet/World Wide Web, once connected the user typically accesses information available therein by using a web browser or like application. A web browser is configured to access web pages that are provided through the Internet by other computers. For example, one or more web server computers may be connected to the Internet and configured with one or more web sites or other supporting web applications. A web site typically has one or more static web pages and/or is capable of supplying one or more dynamically generated web pages that the user may selectively download, view and possible interact with.

To identify a particular web site/page the user will typically select a hyper link to the desired web site/page or may choose to manually enter a unique name for the web site/page. The most common name used for identifying a web site/page is known as the uniform resource locator (URL). By entering a URL, the user will be connected to an appropriate web server which hosts the applicable web application(s), and the requested web page will be downloaded, in this case using a hypertext transfer protocol (HTTP), to the web browser. Within the Internet itself, the selected URL is associated with a specific Internet Protocol (IP) address. This IP address takes the form of a unique numerical identifier, which has been assigned to the targeted web server. Thus, a user may also directly enter an IP address in the web browser. However, the majority of users tend to favor the use of the more easily remembered and entered URL.

When a typical web server receives a request, e.g., an HTTP request, from a web browser, it needs to handle the request. Hence, a web server process may be configured to handle the request itself, or may need to pass the request on to another process, e.g., a worker process, that is configured to handle the request. Conventional web server processes tend to listen to a particular port (e.g., "port 80") provided by a Transmission Control Protocol/Internet Protocol (TCP/IP) kernel-mode provided service. When a request is received, the web server process either handles the request or calls for a worker process to handle the request. To determine which worker process should handle the request, most conventional web server processes either map the request to a physical file or to a dynamic application of some sort, such as a DLL or CGI process. Mapping is typically based on the extension provided at the end of the URL. For example, an ".html" extension signifies that the desired web page is in a HyperText Markup Language format. This extension could then be found, for example, in a look-up table, and associated with a specific worker process, if needed. Conversely, the .html extension may identify that the web server process can handle the request itself. There exists a plurality of extensions that may be used to identify the applicable worker process.

Once a specific worker process has been identified, the worker process is started (as needed) and the request is forwarded to the worker process. Such decisions and subsequent routing of the request are conducted by user-mode processes. Note that the web server process is a user-mode process too.

Unfortunately, there is usually a delay associated with such user-mode "process hops". For web servers, which often receive thousands of requests each minute, the delays associated with process hops can diminish the efficiency of the web server. In certain configurations, the web server process may be required to share a common communication port with one or more worker processes. This too may further reduce the efficiency of the web server. Moreover, there can be a reduction in the robustness of the web server in certain situations, e.g., when a worker process fails to receive/complete the request, etc.

Figure 2:
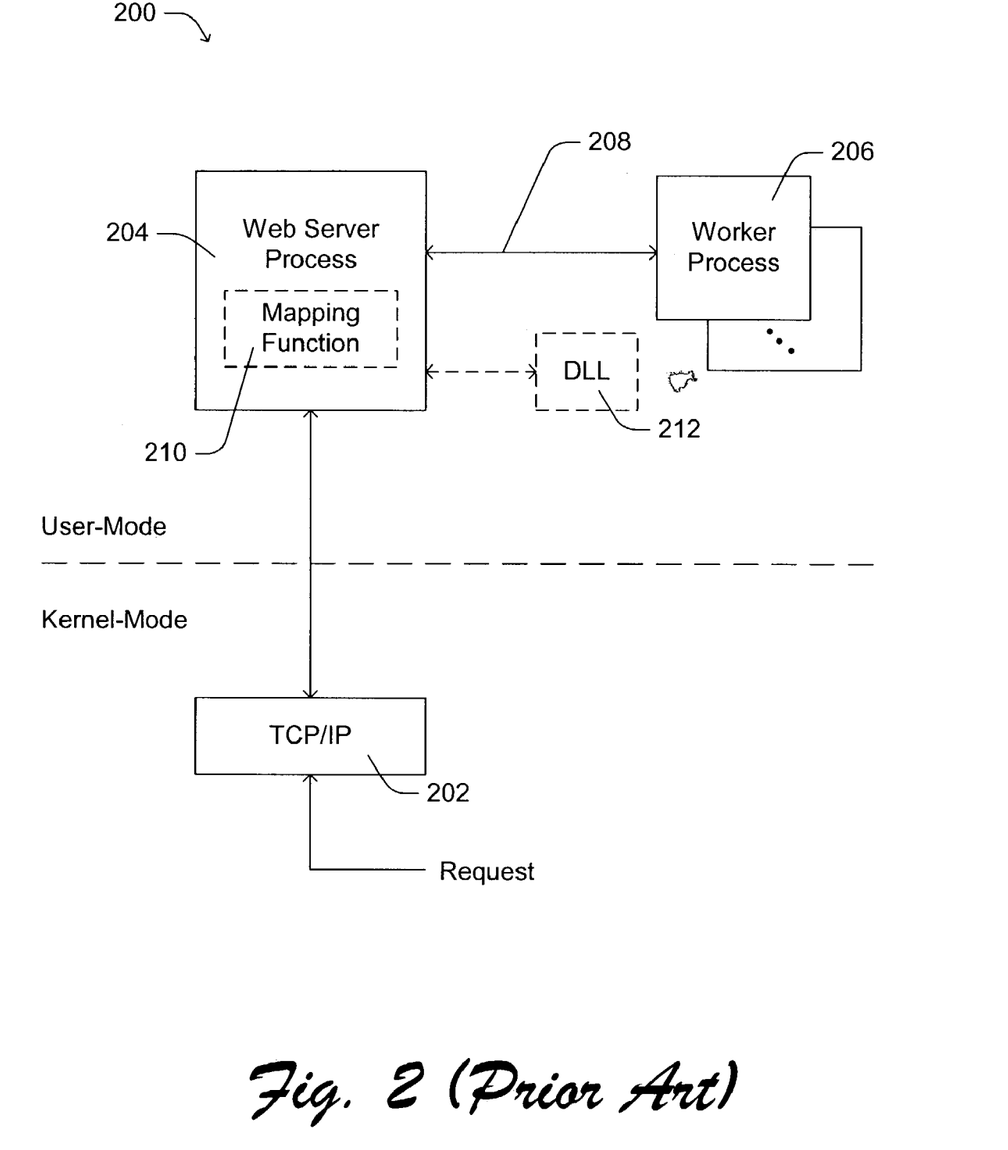
FIG. 2 is a block diagram depicting certain kernel-mode and user-mode processes associated with a conventional web server.

To further illustrate such problems, reference is made to FIG. 2, which depicts an exemplary conventional web server arrangement 200. Here, requests are received from a client computer, e.g., over a network and applicable interfaces (not shown), by a kernel-mode TCP/IP service 202. TCP/IP service 202 provides the request to a user-mode web server process 204 through a port. By way of example, web server process 204 may be an earlier generation IIS web server process as developed by Microsoft Corp.

As illustrated, web server process 204, when needed, can initiate a process hop to one or more user-mode worker processes 206, as represented by line 208. Worker processes 208 may take the form of any of a variety of functions, and/or applications, which are configured to handle or otherwise support certain types of requests. To determine which of worker process 206 needs to handle a given request, web server process 204 can access a mapping function 210 (e.g., a table, list, etc.) and identify an appropriate worker process based on the extension-identifying portion of the URL in the request. Alternatively, web server 204 may require the assistance of a DLL 212 in making such a decision. Here, for example DLL 212 or a like capability would identify the appropriate worker process based on the extension-identifying portion of the URL in the request.

Figure 3:
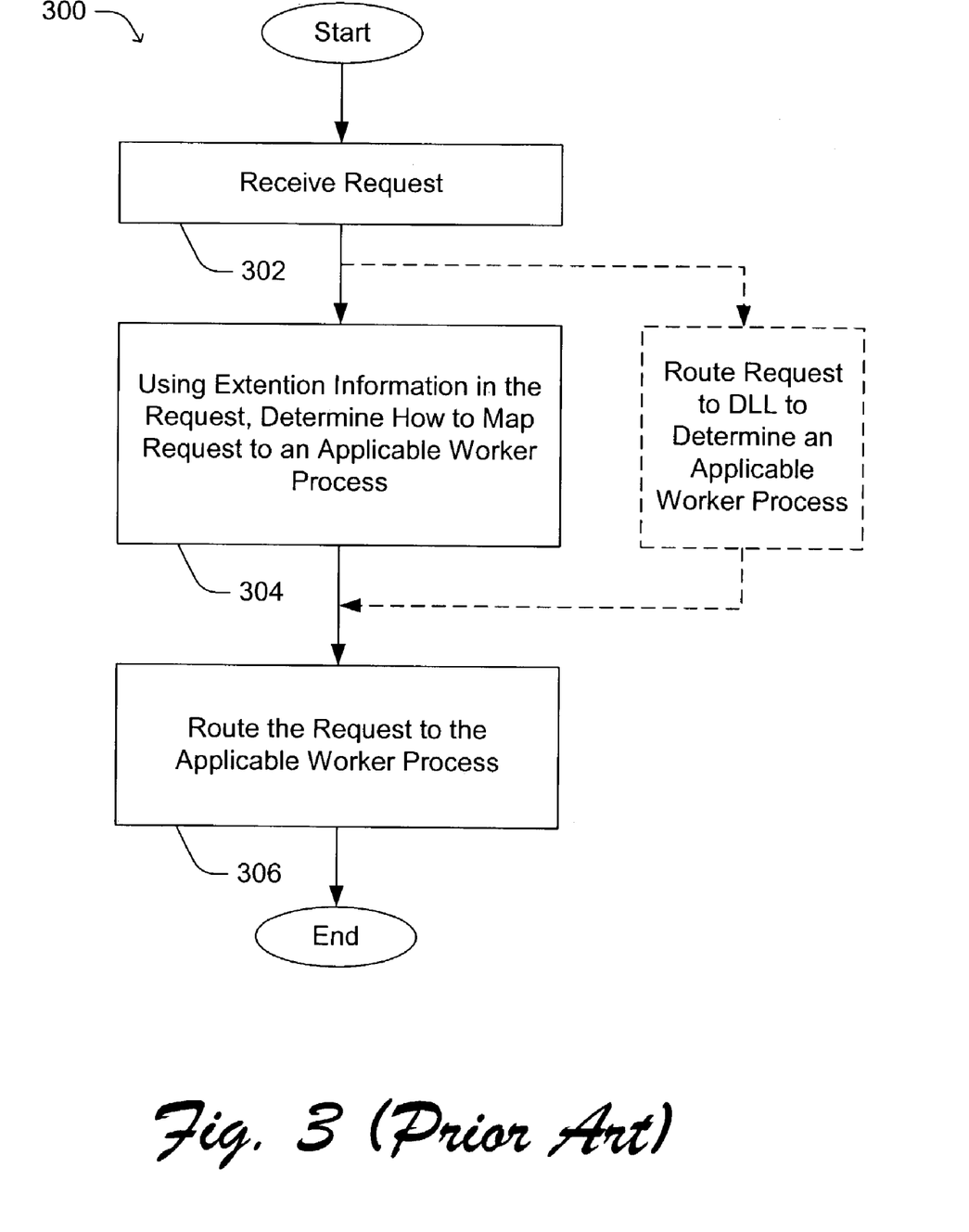
FIG. 3 is a flow chart depicting a conventional method for handling requests using the web server in FIG. 2.

FIG. 3 presents a flow chart depicting an exemplary conventional method 300 for handling requests received by web server arrangement 200. In step 302, the request is received by TCP/IP service 202 and passed on to web server process 204. Next, in step 304, web server 204 determines if there is a need to invoke a worker process 206. Again this is typically determined based on the extension-identifying portion of the URL. The extension-identifying portion of the URL essentially identifies the type of data associated with the defined, and consequently may be used to redirect or route the request to an applicable user-mode process. The next step, 306, is to pass or route the request to the applicable user-mode process for further handling.

As shown, in certain configurations, step 304 can be replaced or otherwise supported/enhanced by step 308, which in this example routes the request to DLL 212 or other like user-mode process to help determine which user-mode worker process 206 would be appropriate to handle the request. As in step 304, step 308 would also likely use the extension-identifying portion of the URL to help make such decisions.

As mentioned earlier, there are several drawbacks to web server arrangement 200 and associated method 300. One of the major drawbacks is the inherent delay associated with each user-mode process hop (e.g., cross-process context switch). Another is the need to multiplex or otherwise share the use of one or more communication ports between user-mode processes. Yet another is often the lack of management over the worker processes, especially, for example, should one fail during the processing of a request.

As such, there is need for improved methods, apparatuses and systems that provide an improved web server environment/design.

SUMMARY

An improved web server environment/design is provided.

The above stated needs and others are met, for example, by a method for use in a web server arrangement having a kernel-mode listener service capable of receiving a web request and providing the web request to at least one user mode web application, and wherein the listener service and the web application are operatively configured by a user-mode administrative process. The method includes causing the administrative process to determine when the web application needs to be recycled and to selectively recycle the web application.

In certain implementations the web application is recycled because the administrative process determined that the web application failed to operate properly. This determination may be based, for example, on receipt of a message indicating a problem with the web application. Such a message may be sent by the web application itself or some related in-process and/or out-of-process application. By way of example, an ISAPI extension may send the message.

In some implementations the administrative process sends a health status request message to the web application. The administrative process will determine that the web application is failing to operate properly if the web application fails to respond to the health status request message within a defined period of time.

In other exemplary implementations the administrative process determines that the web application is failing to operate properly when an operating system informs the administrative process that a handle associated with the web application has exited.

The administrative process may also determine that the web application needs to be recycled based on an amount of time that the web application has been operating. In some instances, the administrative process determines that the web application needs to be recycled based on a recycle schedule.

According to certain implementations, the method also includes causing the listener service to track a number of requests handled by the web application and causing the administrative process to determine when the web application needs to be recycled based on the number of requests handled by the web application. In still further implementations, the administrative process may determine that the web application needs to be recycled based on an amount of memory associated with the web application. Here, for example, the memory may include private memory associated with the web application and/or a virtual memory associated with the web application.

The method may also include causing the listener service to track a number of requests handled by the web application over a defined period of time, and causing the administrative process to determine that the web application needs to be recycled when the web application is "idle" during the defined period of time.

The method may further include causing the listener service to identify when there is a current demand for the web application, and only recycle the web application when the listener service identifies such demands.

In still other implementations, the administrative process is configured to track a number of times that the web application has been recycled during a defined period of time and only recycle the web application when that number is less than some threshold value. The method may also include causing the administrative process to track a number of times that the web application has been recycled for failing to operate properly during the defined period of time. In some implementations, the method also includes causing the listener service to reject received requests for the web application when the number of times that the web application has been recycled during the defined period of time exceeds the threshold value.

In accordance with certain further aspects, the administrative process may be configured to conduct either an overlapping recycle of the web application or a non-overlapping recycle of the web application.

BRIEF DESCRIPTION OF THE DRAWINGS

A more complete understanding of the various methods, apparatuses and systems of the present invention may be had by reference to the following detailed description when taken in conjunction with the accompanying drawings wherein.

DESCRIPTION

Overview

This description is divided into five sections, each of which builds upon one or more of the previous section(s).

The first section presents an exemplary computing environment.

The second section presents exemplary techniques for improving request handling in a web server. Here, for example, an improved web server design is introduced to handle requests, based on URLs or the like, within a kernel-mode universal listener process. Such techniques are the subject of the parent U.S. patent application Ser. No. 09/878,950, filed on Jun. 11, 2001, which is incorporated in its entirety herein by reference.

The third section presents certain further exemplary techniques for use in the improved web server architecture. Here, for example, the kernel-mode universal listener process includes a request queuing capability and caching capabilities. The user-mode Web Administrative Service introduced in the first section is further configured with a process manager capability in addition to its configuration capability. Such techniques are the subject of U.S. patent application Ser. No. 10/377,175, filed Feb. 28, 2003, and titled "An Improved Web Server Architecture", which is incorporated in its entirety herein by reference.

The fourth section describes exemplary techniques, further in accordance with certain aspects of the present invention, for ensuring the health/availability of web applications within such improved web server architectures and/or other like arrangements.

The fifth section describes exemplary techniques for creating and managing web gardens that include a plurality of instances of a user-mode web application. Such techniques are the subject of U.S. application for Letters Patent Ser. No. 10/377,176, filed Feb. 28, 2003, and titled "Web Garden Application Pools Having a Plurality of User-Mode Web Applications".

Exemplary Computing Environment

Turning to the drawings, wherein like reference numerals refer to like elements, the invention is illustrated as being implemented in a suitable computing environment. Although not required, the invention will be described in the general context of computer-executable instructions, such as program modules, being executed by a server computer, which may take the form of a personal computer, a workstation, a dedicated server, a plurality of processors, a mainframe computer, etc. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote memory storage devices.

Figure 1:
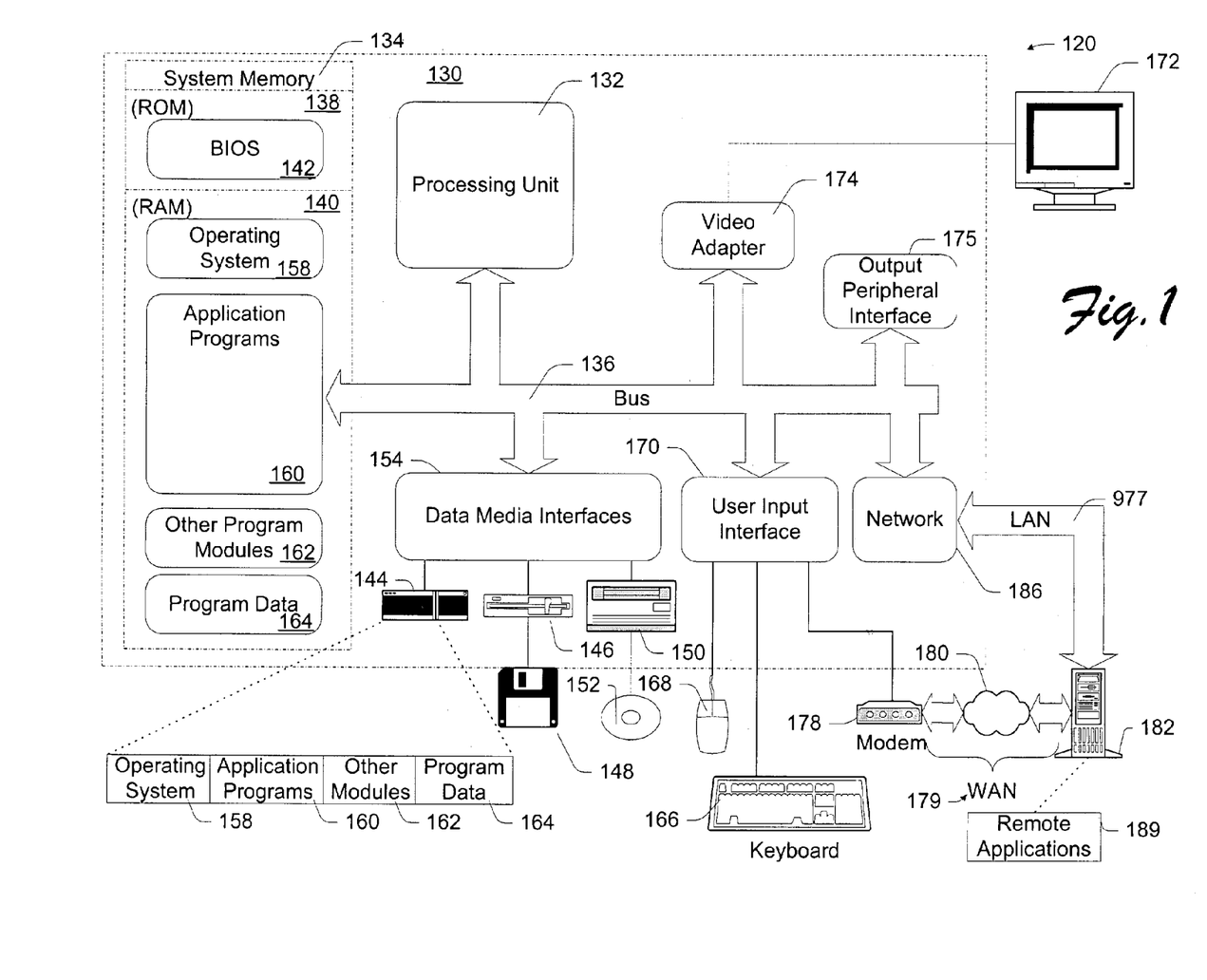
FIG. 1 is a block diagram that depicts an exemplary device, in the form of a computer, which is suitable for use with certain implementations of the present invention.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Improved Request Handling Techniques

Figure 4:
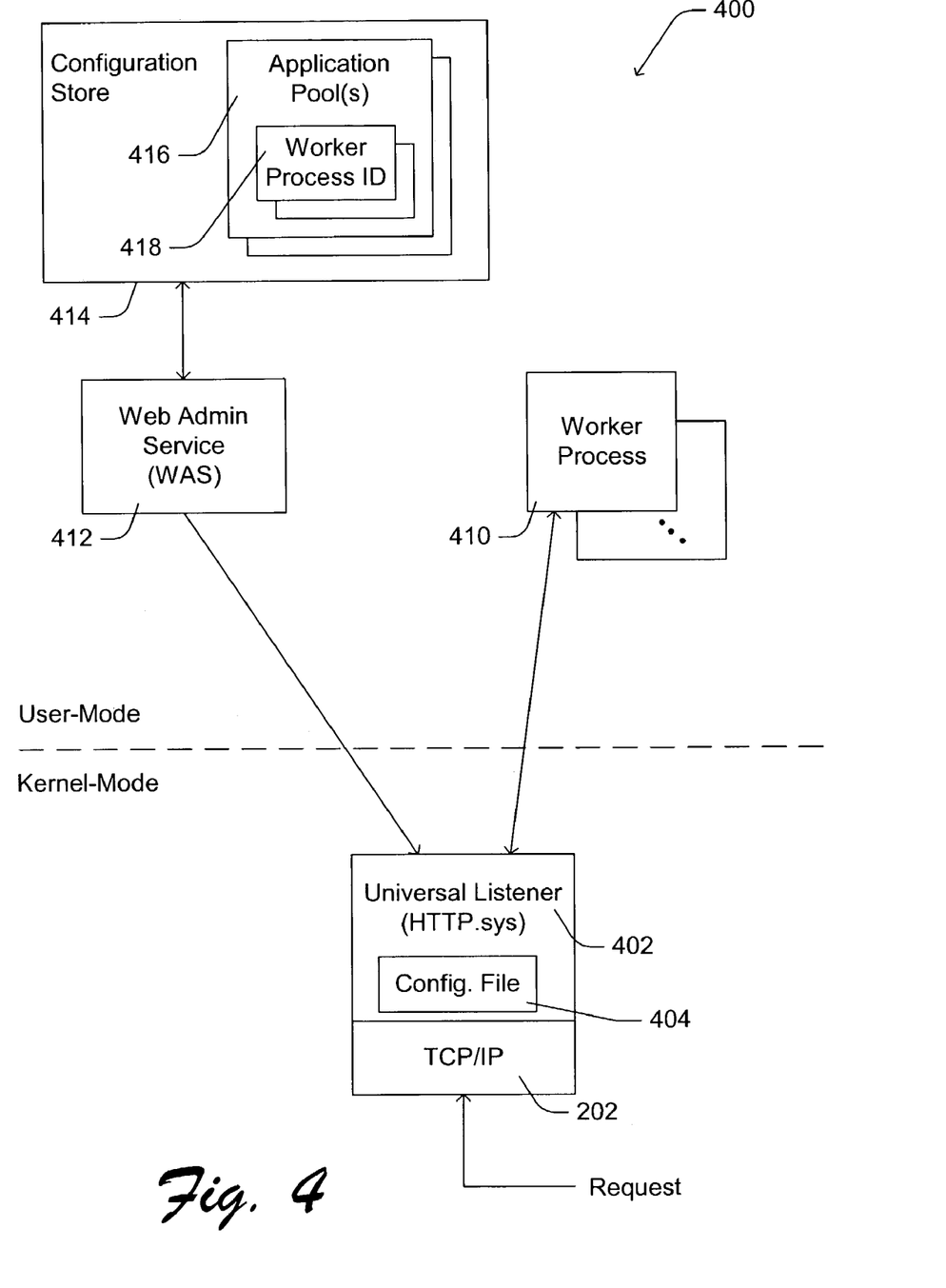
FIG. 4 is a block diagram depicting certain kernel-mode and user-mode processes, including a kernel-mode universal listener (HTTP.sys) process, associated with an improved web server in accordance with certain exemplary implementations of the present invention.

Attention is drawn to the exemplary improved web server arrangement 400 that is depicted in FIG. 4. Here, as shown and described below, certain functions have been determined and designed to be handled by either kernel-mode processes or user-mode processes. In the past, web servers tended to be strictly user-mode processes.

With this in mind, improved web server arrangement 400 includes a kernel-mode universal listener (HTTP.sys) service 402, which is provided on top of TCP/IP service 202. HTTP.sys service 402 includes or otherwise is configured to access a configuration file 404. For purposes of simplicity, in this example configuration file 404 is illustrated as being logically within the representative block of HTTP.sys service 402.

Configuration file 404 is configured to support a decision process that determines which, if any, user-mode process should handle a request as received via TCP/IP service 202. Rather than examining the extension-identifying portion of the URL in the received request to make such a determination, HTTP.sys service 402 and configuration file 404 are configured to examine the hierarchical formatted information in the URL. The resulting decision will then cause HTTP.sys service 402 to either deny the request or provide the request to a most-appropriate user-mode process. In certain implementations, HTTP.sys service 402 stores the configuration information as a tree of URL's in memory, rather than as a file.

For example, as shown, worker process 410 may pull or otherwise retrieve/receive the request from HTTP.sys service 402 for further handling. Doing so essentially eliminates user-mode process hops and associated processing delays because the request goes straight to the appropriate user-mode process instead of going through an intermediate user-mode process. Further, each of the user-mode processes can be supported by a private (non-shared) interface with kernel-mode HTTP.sys service 402. Additionally, HTTP.sys service 402 may be advantageously configured to provide improved management over such interfaces and/or the various user-mode processes.

In accordance with certain implementations, configuration file 404 is updated or otherwise managed via a user-mode Web Administration Service (WAS) process 412. As depicted, WAS process 412 is operatively associated with a configuration store 414. Configuration store 414 provides the necessary information about the structure/configuration of web server arrangement 400 to allow for certain associations to be made between at least a portion of the available web accessible sites/pages/services provided therein and the supporting user-mode processes. For example, configuration store 414 may define a plurality of application pools 416, each having associated with it one or more user-mode process identifiers 418.

WAS process 412 maintains configuration file 404 using the associated information in configuration store 414. Thus, for example, configuration file 404 may include a listing or similar tree-like arrangement that can be quickly examined upon receiving a request based on the hierarchical portion of the URL. A plurality of data may be associated together in configuration groups such that HTTP.sys service 402 can begin to systematically "walk through" the hierarchical portion of the requested URL to find the best matching configuration group and once found identify the most-appropriate application pool.

Those skilled in the art will recognize that configuration store 414, and configuration file 404, and/or sub-portions thereof may be arranged/configured using a variety of different data handling/processing techniques. A tree-like structure is therefore just one exemplary type data association technique. Preferably, the selected technique will support quick searching in order to find the best matching configuration group, etc., based on the requested URL.

Configuration file 404 may also provide guidance or define logical rules with regard to the selection of a user-mode process in a given application pool 416. Thus, for example, a possible rule may prioritize the use of user-mode processes according to some scheme. One such exemplary scheme may cause HTTP.sys service 402 to look for already running user-mode processes, rather than start a new user-mode process. Rules may also be provided to better manage the private interfaces and the running/halting/closing of user-mode processes.

WAS process 412 is configured to provide user administration capabilities in configuring, maintaining, or otherwise modifying all or part of configuration store 414. Thus, for example, a web server administrator may add/delete data, or otherwise modify existing data in configuration store 414, as needed. In certain configurations, the administrator may be able to define one or more rules or parameters that operatively affect the operation of HTTP.sys service 402. In other exemplary implementations, one or more automated or semi-automated user-mode processes/applications may be used to gather and/or otherwise provide data for use in configuration store 414.

Figure 5:
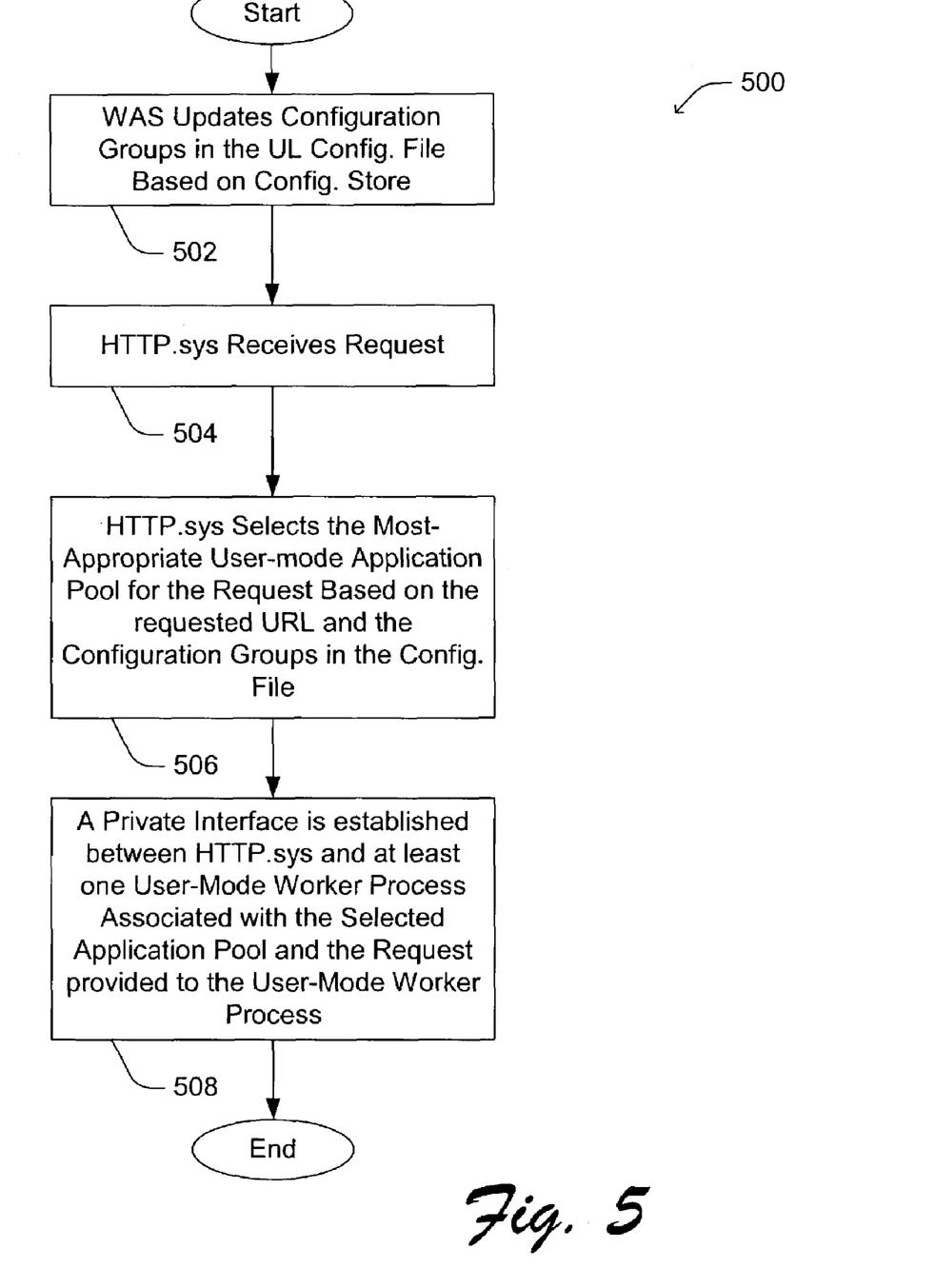
FIG. 5 is a flow chart depicting a method for handling requests using an improved web server, for example, as in FIG. 4, in accordance with certain exemplary implementations of the present invention.

Reference is now made to FIG. 5, which is a flow chart depicting an improved process 500 for use in handling requests in a web server arrangement. In act 502, WAS process 412 updates or otherwise establishes/maintains the configuration group(s) in configuration file 404 associated with kernel-mode HTTP.sys service 402, based on information in configuration store 414. Next, in act 504, a request is received from a client device by HTTP.sys process 402, e.g., via TCP/IP service 202 and interconnecting network services/arrangements. The request includes a URL.

In act 506, HTTP.sys service 402 examines the URL in the received request and searches or in some other manner attempts to identify a most appropriate user-mode application pool 416 associated with a best matching configuration group. For example, the best matching configuration group might be the configuration group defined in configuration file 404 that best matches the URL.

Next, in act 508, the most appropriate user-mode process identified in the application pool is started (if needed) and/or otherwise communicated with by HTTP.sys service 402 and provided with the request for further handling. In certain instances, there may be a need to have the request handled by more than one user-mode process.

Further Improved Web Server Architecture

Some of the goals satisfied in creating the improved web server architecture included providing a web server arrangement that was more reliable, stable, secure, and performed better than conventional web server arrangements. Web server arrangement 400 (described in the section above) sought to separate certain functions and handle some of them in kernel-mode processes and others in user-mode processes. These techniques and ideas are expanded upon in this section, in accordance with certain exemplary implementations of the present invention.

Figure 6:
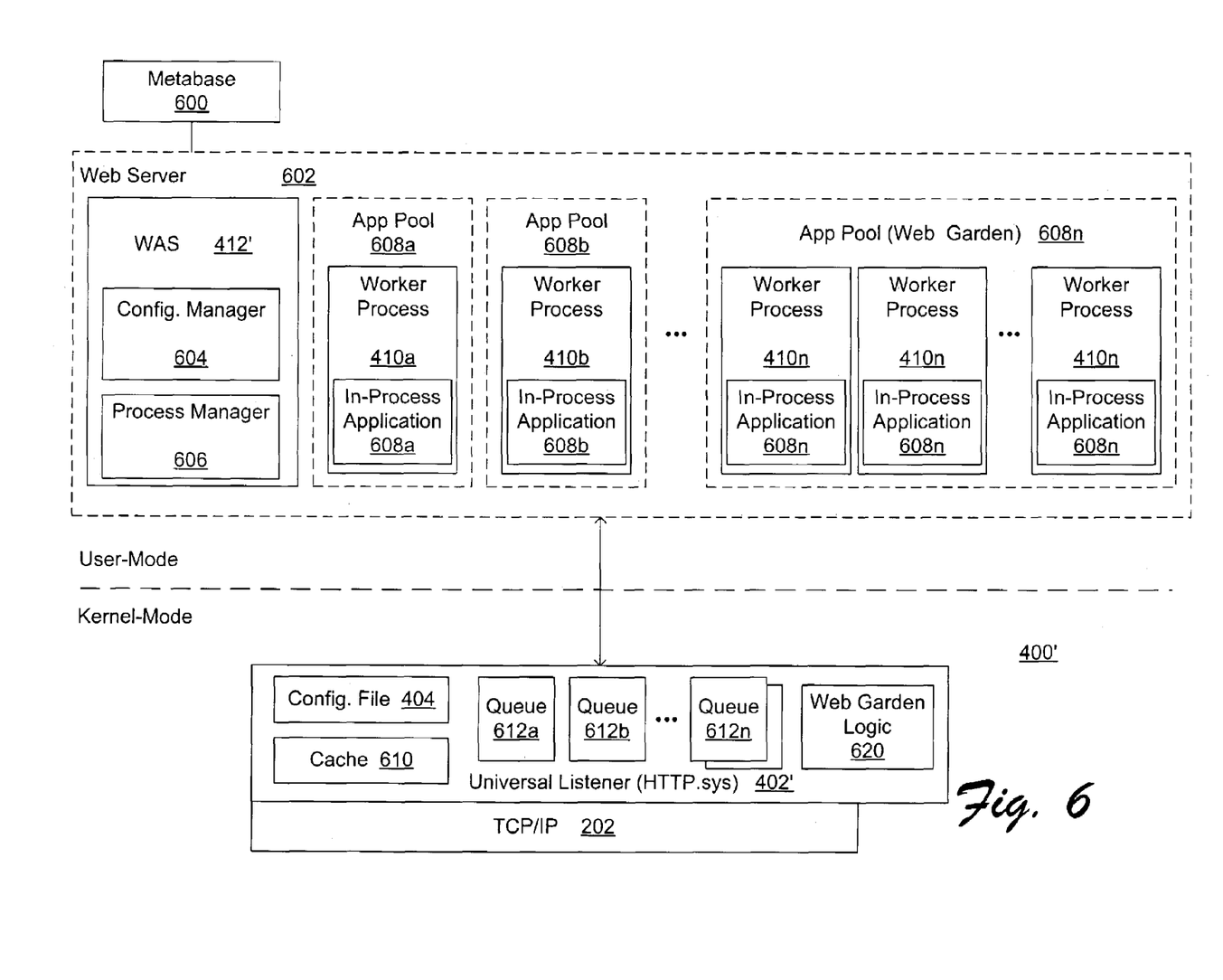
FIG. 6 is a block diagram depicting an improved web server arrangement that builds upon the web server arrangement in FIG. 4, in accordance with certain further implementations of the present invention.

Attention is drawn to FIG. 6. Here, a web server arrangement 400' continues to be divided into key portions based on functionality. Request reception and routing are handled by a HTTP.sys service 402' in the kernel, a WAS process 412' is provided as a separate user-mode process that may fail (crash) without necessarily affecting kernel-mode HTTP.sys service 402'. In this example, WAS process 412' includes a configuration manager 604 and a process manager 606. The actual web application processing is done within separate user-mode processes (e.g., worker processes 410a, 410b and 410n, and in-process applications 608a, 608b and 608n) that may also crash without affecting kernel-mode HTTP.sys service 402', WAS process 412', or other user-mode web application processes. In this way, software failures should be effectively isolated to only the host process, thereby allowing the web server to continue operating as if nothing happened.

Also depicted in FIG. 6 is a metabase 600 that can be accessed by web server 602, and more particularly by WAS process 412' therein. Metabase 600 may include, for example, configuration store 414, as previously described. HTTP.sys service 402' includes a configuration file 404 and also includes a response cache 610 and request queues 612a, 612b and 612n. Several application pools 608a, 608b and 608n are shown in the user-mode side of the architecture, as are worker processes 410a, 410b and 410n.

In this exemplary implementation, HTTP.sys service 402' is configured to receive and manage connection requests, parse incoming requests as they are received, and manage the size and routing of requests to the request queues. HTTP.sys service 402' may also be configured to provide or otherwise support logging, such as, for example, text-based request hit logging.

Configuration manager 604 is responsible for configuring HTTP.sys service 402' based on metabase 600, and for periodically/continually updating HTTP.sys service 402' with changes in web server configuration. Process manager 606 is responsible for managing the starting, stopping, and monitoring of the multiple web application processes, which serve the various application pools 608.

The web application processes or worker processes 410 are the user-mode processes which are responsible for taking requests from the appropriate request queue 612, loading and executing web application code (if applicable to the web request), and generating the response to be sent back to the client. Each worker process 410 serves just one application pool 608. Thus, for example, as depicted worker process 410a serves application pool 608a and worker process 410b serves application pool 608b. There can be multiple worker processes running at any given time. Application pool 608n illustrates that a plurality of worker processes 410n may be provided within one application pool. Application pools 608 are, as previously described, basically named identifiers that are used to identify specific worker processes or "pools" of worker processes to which requests are routed. They also correspond to request queues within the HTTP.sys (612a, 612b, 612n).

When web server 602 is started, WAS process 412' will begin by reading the specific web site and application configuration from a configuration store in metabase 600 and proceed to configure HTTP.sys service 402'. Thus, for example, WAS process 412' is configured to create a request queue 612 for each application pool 608, configure HTTP-.sys service 402' as to which sites to listen to (e.g., sockets to open), and configure HTTP.sys service 402' as to which request queue 612 to route various requests to. WAS process 412' may also configure bandwidth and connection limits within HTTP.sys service 402'.

HTTP.sys service 402' then opens communication sockets as configured by WAS process 412' and begins listening for TCP/IP connection requests. Beyond accepting incoming requests, routing them to the appropriate user-mode worker process 410, and sending the responses back to the clients, the Kernel-mode HTTP.sys service 402' typically does no other request processing. Hence, HTTP.sys service 402' receives requests, routes the requests, and forwards responses to the client (e.g., through TCP/IP 202 and/or the like). HTTP.sys service 402' is not, however, responsible for loading and executing application code to generate the response.

One slight exception is that for certain requests, cache 610 in HTTP.sys service 402' may include a previously generated and stored response that has been flagged or otherwise identified as being the correct response for any subsequent identical requests, or error conditions that HTTP.sys handles (such as connection limits). Thus, for example, worker process 410*b* may handle an initial request by generating a response, which is provided to HTTP.sys service 402' for forwarding to the requesting client. Worker process 410*b* may also identify to HTTP.sys service 402' that if such a request from this and/or from other clients is received, then the same response should be forwarded to the requesting clients. Thus, HTTP.sys service 402' stores the response in cache 610. In certain implementations, such cache-based responses may be limited to a specific period of time, a certain number of requests, and/or the continued health and availability of the worker process that initially generated the response. In some implementations, the worker process that initially generated the response may inform HTTP.sys service 402' to clear certain cached responses.

Beyond managing the configuration of HTTP.sys service 402', WAS process 412' and more particularly process manager 606 is also responsible for managing the lifetime of the various worker processes 410. For example, process manager 606 is responsible for starting up new worker processes, shutting down old/problematic processes, and ensuring that these processes are able to continue to accept requests from HTTP.sys service 402'.

Worker processes 410 are typically where third-party customer code is run and general web application processing is accomplished. When a worker process 410 is started by WAS process 412' (process manager 606), it is informed as to which application pool 608 it serves. In accordance with certain exemplary implementations, a worker process 410 is configured to use an application pool ID when it communicates with HTTP.sys service 402' to obtain new requests from within the kernel (e.g., from a request queue 612).

After obtaining a request from a request queue 612, the worker process 410 will proceed to process that request, loading and executing whatever code (save CGI's or the like, which are executed out of process) is necessary and configured for that web application request. For example, worker process 410*a* may use in-process application 608*a*. Worker process 410*a* eventually generates the response for the request and sends that response to HTTP.sys service 402' for forwarding to the requesting client.

If the web application code or something else causes a worker process 410 to fail, for whatever reason, the termination of the worker process will not affect other worker processes that are servicing different request queues 612. Likewise, clients generating requests for the failed worker process' application pool will not be rejected simply because of the failure. HTTP.sys service 402' and WAS process 412' are not affected by this failure, because WAS process 412' is running in separate process and HTTP.sys is part of the operating system kernel. HTTP.sys service 402' will continue to accept requests and route them accordingly while process manager 606 starts a new worker process 410 to replace the failed worker process.

This arrangement also allows for increased performance while also providing increased reliability through process isolation. Each worker process will only serve the URL's that are routed to its application pool's request queue and will contact the kernel mode HTTP.sys service 402' to get requests directly instead of having them routed through another user-mode processes.

As described in greater detail in the next section of this description, this architecture also enables health monitoring. As mentioned before, WAS process 412' is also responsible for managing the individual web application worker processes. As part of this management role, process manager 606 can be configured to maintain some form of communication with each worker process 410. This allows process manager 606 to periodically determine the health/availability of each worker process.

Techniques for Ensuring the Health/Availability of Web Applications

In accordance with certain further exemplary implementations, a series of related features are presented that are designed to allow improved web server arrangement 400' to proactively and/or reactively recover from availability problems caused, for example, by worker process failures.

These features can be are divided into different categories. One category includes techniques that are essentially proactive ways to ensure the health of worker processes. By way of example, in some cases the health of a worker process 410 may be better ensured by periodically recycling it.

In accordance with certain implementations, if an Internet Server Application Programming Interface (ISAPI) extension that is able to report itself as unhealthy (for whatever reason), does so then an applicable worker process may be recycled to better ensure its health.

In other examples, if a worker process is idle for a certain amount of time, then it may be shut down to possibly free up resources for other processes. The health of some worker processes may be best ensured by only starting up the worker process when there is demand for it, e.g., a request is received. This has the added benefit that any shared resources would be available to other worker processes, such as, more frequently requested web applications.

Another category of features includes techniques that are essentially reactive ways to better ensure the health/availability of worker processes. One exemplary technique is to periodically ping worker processes, for example, to determine if there is at least one thread available to accept new work (requests). A worker process can be restarted if the ping fails. Alternatively, a debugging or other like process may be initiated and run on a ping-dead worker process.

Another technique includes, detecting when a worker process crashes unexpectedly and automatically restarting a new version of the worker process, for example, if there is a continuing demand for it. Yet another exemplary technique includes protecting the server itself from a repeated series of worker process failures by stopping the web applications assigned to the host process.

All or part of these exemplary collective methods can be employed to allow improved web server arrangement 400' to ensure web application availability in light of faulty third party code, for example, which would otherwise cause the web server (and web applications) to possibly become unavailable for some period of time.

Such techniques and others like them can be operatively configured within WAS process 412', and more particularly within process manager 606. Some exemplary techniques are described in more detail in the following paragraphs.

Periodic Worker Process Recycling

By way of further example, process manager 606 can be configured to periodically refresh worker processes. The determination as to when to recycle or refresh a worker process 410 can be based on a variety of factors. For example, such factors may include the amount of time (e.g., number of minutes) that a worker process has been running, a scheduled time of day, the number of requests processed by the worker process, an amount of (private and/or virtual) memory associated with the worker process, and/or a demand from some process, such as, e.g., an administrative API.

Recycling is basically a technique that includes causing the old worker process to shutdown and starting a new worker process in its place. Recycling can be performed in a few different ways. One way to perform a recycle is what is referred to herein as an overlapping recycle. Another way is referred to as a non-overlapping recycle. Basically, in an overlapping recycle, process manager 606 will first start a new worker process while the old worker process is still running. Once the new worker process is ready to start handling requests then the old worker process is shutdown. Conversely, a non-overlapping recycle basically starts the new worker process after shutting down the old worker process.

By way of further example, in an overlapping recycle process manager 606 determines when to recycle a worker process, e.g., based on one or more of the factors described above. In certain other implementations, a WP determines when to recycle itself and does so by requesting that process manager 606 recycle it. In such implementations, process manager 606 may be configured to recycle a WP based on configuration changes, application pool identity changes, on demand, etc.

Next, process manager 606 starts a new worker process while the old worker process continues to handle requests. The new worker process initializes and informs process manager 606 that it is ready to handle requests. The new worker process also hooks up to HTTP.sys service 402' and begins handling requests for the request queue (application pool) it is assigned to. Process manager 606 instructs the old worker process to revoke any outstanding instructions to HTTP.sys service 402' seeking a new request to handle. Process manager 606, however, allows the old worker process to complete a request that has already been provided to it by HTTP.sys service 402', after that the old worker process is shutdown.

In an exemplary non-overlapping recycle, process manager 606 again determines when to recycle a worker process, e.g., based on one or more of the factors described above. In other implementations, as mentioned above, the WP may determine when it needs to be recycled.

Process manager 606 then instructs the old worker process to revoke any outstanding instructions to HTTP.sys service 402' seeking a new request to handle, but allows the old worker process to complete a request that has already been provided to it by HTTP.sys service 402', after that the old worker process is shutdown. Process manager 606 may then start a new worker process automatically. In some circumstances process manager 606 may decide to wait until certain resources are available before starting the new worker process, or to wait for HTTP.sys service 402' to request that a new worker process be started to meet client request demand.

In certain implementations, it may also be desirable to recycle all of the worker processes in an application pool 608.

It should be understood that process manager 606 and/or a worker process 410 may be configured to log or otherwise output various information regarding the recycle process, or any other process or problem.

ISAPI Extensions Being Able to Report Themselves as Unhealthy

Web server 602 may also be configured to allow ISAPI extensions to call into the host process and report themselves as unhealthy and provide a string reason as to why. This string is then used, for example, to publish an event to an event log (not shown) and/or notify the system administrator that the ISAPI extension reported itself as unhealthy for the reason provided in the string. If worker process pinging is enabled, then the worker process may request a recycle immediately after responding to the health detecting ping message. By way of example, this would allows application environments, such as ASP and ASP.NET, to request a host process recycle if it gets into a bad state for whatever reason.

Idle Timeout of Web Application Host Processes

HTTP.sys service 402' may also be configured to automatically time out idle worker processes and shut them down. Doing so may prevent idle worker processes from consuming resources that active applications may need, such as memory. Here, for example, HTTP.sys service 402' may have a programmable timer or other like mechanism that essentially keeps track of how long it has been since a worker process has processed a request, and if a programmable threshold has been reached, then HTTP.sys service 402' will request that process manager 606 shutdown the applicable worker process.

Demand Start of Web Application Host Processes

HTTP.sys service 402' and process manager 606 can be configured to only start worker applications if there is demand for them (i.e., at least one request from a client has been received). Here, for example, process manager 606 will inform HTTP.sys service 402' that it may request startup of a worker process 410 for a given request queue 612 should there be a demand for it. Thus, when a request from a client arrives, HTTP.sys service 402' will check to see if there are any worker processes currently serving the applicable request queue and if not, HTTP.sys service 402' will request that process manager 606 startup a new worker process to service the request queue.

Periodic Pinging of Web Application Host Processes

As mentioned above, process manager 606 can be configured to selectively/periodically ping each worker process 410. The goal of this ping is to determine if there is at least one thread available to do work on requests. In accordance with certain exemplary implementations, such pings take the form of a health detection message that is sent over a named pipe that connects the WAS process 412' and worker process 410. The worker process then has a configured time limit in which to respond to the health detection message. If the worker process fails to respond to the health detection message within the configured time limit, then process manager 606 determines that the worker process is unhealthy and therefore terminates the worker process and starts a new one in its place. This activity is typically logged.

In certain implementations, if the worker process is determined to be unhealthy for failing to respond to the health detection message then instead of automatically terminating the worker process a debugging or orphan action can be taken. This may include, for example, taking a process dump of the offending/blocked worker process before terminating it Crash Detection Web server 602 may determine when a worker application 410 crashes since WAS process 412' creates each of the processes and monitors them via Pinging or just being signaled on a process handle. Here, for example, process manager 606 maintains a process handle for each of the worker processes it has started and will be signaled on that handle by the operating system kernel if the worker process exits. This capability allows process manager 606 to then start a new worker process in the place of the failed worker process, if there should be demand for it.

Automatic Disabling of a Request Queue on Repeated Failures

Otherwise known as Rapid Fail Protection, this capability allows WAS process 412' to prevent repeated worker process 410 creation and abnormal termination costs by keeping track of the number of times a worker process serving a particular request queue 612 has been restarted due to abnormal conditions. Basically, it allows WAS process 412' to not put the server into a thrashing state due to a process crashing and restarting.

Instead, for example, process manager 606 can be configured to track the number of times a process has terminated abnormally (including health detection message failures and/or detected crashes) over a given period of time. If a preprogrammed abnormal restart threshold value is exceeded, then process manager 606 will inform HTTP.sys service 402' to stop accepting new requests for the request queue associated with the suspect worker process. This may also lead to an application pool 608 being essentially shutdown. The application pool may, for example, be marked by process manager 606 as disabled in metabase 600 and in HTTP.sys also. HTTP.sys will not queue requests for an application pool that has been shutdown.

This shutdown feature allows web server 602 to use resources for other applications pools/worker processes rather than a web application group that's functioning poorly. This also adds additional security to the web server in the event to a denial of service attack or other like unsavory client activity.

Creating and Maintaining Web Gardens

In this section the concept of a "web garden" is introduced for use in the above improved web server arrangements. Here, the basic idea to provide the ability for process manager 606 to open a plurality of instances of a worker process and techniques for use in HTTP.sys service 402' in routing web requests to the plurality of request queues associated with plurality of instances of the worker process.

With this in mind, as shown in FIG. 6, HTTP.sys service 402' further includes web garden logic 620. Application pool 608n is an example of a web garden since it has a plurality of instances of worker process 410n. Associated with the plurality of instances of worker process 410n are an equal number of request queues 612n.

An exemplary technique for creating this type of web garden includes deciding how large the web garden will be. For example, a maximum number of instances of a worker process can be defined in metabase 600. This maximum number limits the size of the web garden. The web garden may, however, have fewer instances of worker processes. Although not necessary, in some implementations a corresponding minimum number of instances of a worker process may also be defined in metabase 600. The default minimum number in this example is one.

Within these bounds, the web garden will be allowed to grow and shrink depending on the demand (e.g., web requests received) for the worker process 410n. Thus, in accordance with certain implementations of the present invention, when configuration manager 604 creates and/or otherwise updates configuration file 404 the web garden boundaries are set. Assuming that there is only an upper bound, i.e., a maximum number of instances, in certain implementations that parameter defines the number of worker process 410n starts that HTTP.sys service 402' may demand of process manager 606.

In some exemplary implementations, a ticket-like configuration may be implemented to define haw many of these demand starts are available at a given time. Thus, for example, configuration manager 604 may initially grant an applicable number of demand start tickets for worker process 410n to HTTP.sys service 402', and more particularly to web garden logic 620. These demand start tickets may then be submitted or otherwise provided to process manager 606, as needed. Upon receipt of a demand start ticket, process manager 606 would then start a new instance of worker process 410n. If, for some reason, an instance of worker process 410n were stopped or terminated, then process manager could provide a new demand start ticket to web garden logic 620. When web garden logic 620 is out of demand start tickets then it cannot request any more instances of worker process 410n.

With this exemplary ticket scheme or other similar schemes, web garden logic 620 can be configured to act in a variety of ways. One exemplary way in which web garden logic 620 may be configured to act is to always use an available demand start ticket when a new web request is received, until such time as all of the demand start tickets have been used. This tends to maximize the number of instances of worker process 410n, which may provide better performance from the standpoint of requesting clients. There is, however, an increased processing burden on the web server itself.

In certain implementations, when web garden logic 620 submits a demand start ticket to process manager 606 it will not make the web request wait for the new instance of worker process 410n to complete initialization so long as other instances are already running. In this situation, web garden logic 620 will place the web request in an appropriate existing request queue 612n and another instance will eventually handle the web request.

In certain further exemplary implementations, web garden logic 620 is configured to spread received TCP/IP connections among the available request queues. One technique that can be implemented is a round-robin distribution. In certain implementations, all web requests received over a connection are placed in the same request queue and eventually go to the same worker process.

Those skilled in the art will recognize that other distribution techniques may also be employed to meet certain requirements. Furthermore, such techniques may be optimized for use in computers having multiple processors, wherein selected processors are configured to handle certain worker processes 410n.

Since an application pool can be a web garden, all of the previous techniques provided in this description may be applied to manage the worker processes 410n.

In accordance with certain further implementations of the present invention, various techniques can be employed to selectively recycle the worker processes within a web garden. Rather than simply recycling all of the worker processes within a web garden at one time, in certain exemplary implementations a staggered recycling process is employed. For example, using staggered recycling one or more of the worker processes within a web garden are recycled while the other worker processes within the web garden remain active.

With this in mind, for example, certain staggered recycling techniques include determining when to recycle each worker process based on the maximum number of worker processes within a web garden and the number of requests received/handled.

Thus, for example, if a web garden is configured to have a maximum of four worker processes, then a recycle parameter can be set or otherwise determined to stagger the recycling of the worker processes such that each worker process recycles after a certain number of requests have been received and/or handled. Assuming that first, second, third, and fourth worker processes have been started in the web garden as a result of having received four requests, with the first worker process being the oldest and the fourth worker process being the newest, then a staggered recycling technique can be configured to cause the first worker process to recycle after fifth request is received. The second worker process would subsequently recycle after the tenth request is received, the third worker process after the fifteenth request is received, and the fourth worker process after the twentieth request is received. Thereafter, the oldest worker process would then be recycled after every twentieth request is received.

This is just one example as to how a staggered recycle may be implemented. Those skilled in the art will recognize that other staggered recycling techniques may be employed, for example, based on the number of received/handled requests, the number of worker processes, the maximum number of worker processes in the web garden, the age in time of the worker process, the health of a worker process, and/or other like factors that may help to identify when to recycle one or more worker processes. The staggered recycling technique may also be selectively applied, for example, based on time, based on demand, based on process health status, based on traffic loads, etc. However, implemented, one important concept of staggering the recycling of worker processes-within a web garden is to hopefully recycle often enough to promote computationally-good running worker applications without significantly degrading the capability of the web garden and/or the server.

What is claimed is:

1. A method implemented at least in part by a computing device and comprising:
    providing a web server arrangement having a kernel-mode listener service capable of receiving a web request and providing said web request to at least one user mode web application, wherein said listener service and said web application are operatively configured by a user-mode administrative process;
    causing said administrative process to determine when said web application needs to be recycled;
    causing said administrative process to track a number of times that said web application has been recycled during a defined period of time; and
    causing said administrative process to selectively conduct an overlapping recycle of said web application;
    wherein causing said administrative process to determine when said web application needs to be recycled further includes only conducting the overlapping recycle of said web application when said number of times that said web application has been recycled during said defined period of time is less than a threshold value.

2. The method as recited in claim 1, wherein causing said administrative process to determine when said web application needs to be recycled further includes:
    causing said administrative process to determine that said web application is failing to operate properly.

3. The method as recited in claim 2, wherein causing said administrative process to determine that said web application is failing to operate properly further includes:
    causing at least one user-mode process associated with said web application to send a message to said administrative process, said message indicating a problem with said web application.

4. The method as recited in claim 3, wherein said at least one user-mode process includes a process selected from a group of processes including said web application, an in-process application, an out-of-process application, and an Internet Server Application Programming Interface (ISAPI) extension.

5. The method as recited in claim 2, wherein causing said administrative process to determine that said web application is failing to operate properly further includes:
    causing said administrative process to send a health status request message to said web application; and
    causing said administrative process to determine that said web application is failing to operate properly if said web application fails to respond to said health status request message within a defined period of time.

6. The method as recited in claim 5, wherein:
    with said health status request message, causing said administrative process to determine if there is at least one thread associated with said web application available to accept a new request.

7. The method as recited in claim 2, wherein causing said administrative process to determine that said web application is failing to operate properly further includes:
    causing said administrative process to determine that said web application is failing to operate properly when an operating system informs said administrative process that a handle associated with said web application has exited.

8. The method as recited in claim 1, wherein causing said administrative process to determine when said web application needs to be recycled further includes:
    causing said administrative process to determine that said web application needs to be recycled based on an amount of time that said web application has been operating.

9. The method as recited in claim 1, wherein causing said administrative process to determine when said web application needs to be recycled further includes:
    causing said administrative process to determine that said web application needs to be recycled based on a recycle schedule.

10. The method as recited in claim 1, further comprising:
    causing said listener service to track a number of requests handled by said web application; and
    wherein causing said administrative process to determine when said web application needs to be recycled further includes causing said administrative process to determine that said web application needs to be recycled based on said number of requests handled by said web application.

11. The method as recited in claim 1, wherein causing said administrative process to determine when said web application needs to be recycled further includes:
    causing said administrative process to determine that said web application needs to be recycled based on an amount of memory associated with said web application.

12. The method as recited in claim 11, wherein said amount of memory associated with said web application includes at least one type of memory selected from a group comprising a private memory associated with said web application and a virtual memory associated with said web application.

13. The method as recited in claim 1, further comprising:
causing said listener service to track a number of requests handled by said web application over a defined period of time; and
wherein causing said administrative process to determine when said web application needs to be recycled further includes causing said administrative process to determine that said web application needs to be recycled based on said number of requests handled by said web application over said defined period of time such that it is determined that said web application is deemed to have been idle during said defined period of time.

14. The method as recited in claim 1, further comprising:
causing said listener service to identify when there is a current demand for said web application; and
wherein causing said administrative process to determine when said web application needs to be recycled further includes only conducting the overlapping recycle of said web application when said listener service identifies said current demand for said web application.

15. The method as recited in claim 1, wherein causing said administrative process to track a number of times that said web application has been recycled during a defined period of time includes tracking a number of times that said web application has been recycled for failing to operate properly during said defined period of time.

16. The method as recited in claim 1, wherein only conducting the overlapping recycle of said web application when said number of times that said web application has been recycled during said defined period of time is less than said threshold value further includes:
causing said listener service to reject received requests for said web application when said number of times that said web application has been recycled during said defined period of time exceeds said threshold value.

17. The method as recited in claim 1, wherein causing said administrative process to selectively conduct an overlapping recycle of said web application comprises:
starting a new web application while said first-mentioned web application is still running and, once the new web application is ready to start handling requests, shutting down said first-mentioned web application.

18. A computer-readable medium having computer implementable instructions therein that, when executed by a computing device, cause the computing device to perform acts comprising:
establishing a web server arrangement having a kernel-mode listener service capable of receiving a web request and providing said web request to at least one user mode worker process, wherein said listener service and said worker process are operatively configured by a user-mode administrative service;
configuring said administrative service to determine when said worker process needs to be recycled;
configuring said administrative process to track a number of times that said worker process has been recycled during a defined period of time;
configuring said administrative service to selectively conduct an overlapping recycle of said worker process;
wherein configuring said administrative process to determine when said worker process needs to be recycled further includes only conducting the overlapping recycle of said worker process when said number of times that said worker process has been recycled during said defined period of time is less than a threshold value.

19. The computer-readable medium as recited in claim 18, wherein configuring said administrative service to determine when said worker process needs to be recycled further includes:
configuring said administrative service to determine that said worker process is failing to operate properly.

20. The computer-readable medium as recited in claim 19, wherein configuring said administrative service to determine that said worker process is failing to operate properly further includes:
configuring at least one user-mode process associated with said worker process to send a message to said administrative service, said message indicating a problem with said worker process.

21. The computer-readable medium as recited in claim 20, wherein said at least one user-mode process includes a process selected from a group of processes including said worker process, an in-process application, an out-of-process application, and an Internet Server Application Programming Interface (ISAPI) extension.

22. The computer-readable medium as recited in claim 19, wherein configuring said administrative service to determine that said worker process is failing to operate properly further includes:
configuring said administrative service to send a health status request message to said worker process; and
configuring said administrative service to determine that said worker process is failing to operate properly if said worker process fails to respond to said health status request message within a defined period of time.

23. The computer-readable medium as recited in claim 22, wherein:
with said health status request message, configuring said administrative service to determine if there is at least one thread associated with said worker process available to accept a new request.

24. The computer-readable medium as recited in claim 19, wherein configuring said administrative service to determine that said worker process is failing to operate properly further includes:
configuring said administrative service to determine that said worker process is failing to operate properly when an operating system informs said administrative service that a handle associated with said worker process has exited.

25. The computer-readable medium as recited in claim 18, wherein configuring said administrative service to determine when said worker process needs to be recycled further includes:
configuring said administrative service to determine that said worker process needs to be recycled based at least in part on an amount of time that said worker process has been operating.

26. The computer-readable medium as recited in claim 18, wherein configuring said administrative service to determine when said worker process needs to be recycled further includes:
configuring said administrative service to determine that said worker process needs to be recycled based at least in part on a recycle schedule.

27. The computer-readable medium as recited in claim 18, further comprising:
configuring said listener service to track said number of requests handled by said worker process; and
wherein configuring said administrative service to determine when said worker process needs to be recycled further includes configuring said administrative service to determine that said worker process needs to be recycled based at least in part on said number of requests handled by said worker process.

28. The computer-readable medium as recited in claim 18, wherein configuring said administrative service to determine when said worker process needs to be recycled further includes:
configuring said administrative service to determine that said worker process needs to be recycled based on said amount of memory associated with said worker process.

29. The computer-readable medium as recited in claim 28, wherein said amount of memory associated with said worker process includes at least one type of memory selected from a group comprising a private memory associated with said worker process and a virtual memory associated with said worker process.

30. The computer-readable medium as recited in claim 18, further comprising:
configuring said listener service to track said number of requests handled by said worker process over a defined period of time; and
wherein configuring said administrative service to determine when said worker process needs to be recycled further includes configuring said administrative service to determine that said worker process needs to be recycled based on said number of requests handled by said worker process over said defined period of time such that it is determined that said worker process is deemed to have been idle during said defined period of time.

31. The computer-readable medium as recited in claim 18, further comprising:
configuring said listener service to identify when there is a current demand for said worker process; and
wherein configuring said administrative service to determine when said worker process needs to be recycled further includes only recycling said worker process when said listener service identifies said current demand for said worker process.

32. The computer-readable medium as recited in claim 18, wherein configuring said administrative service to track a number of times that said worker process has been recycled during a defined period of time includes tracking a number of times that said worker process has been recycled for failing to operate properly during said defined period of time.

33. The computer-readable medium as recited in claim 18, wherein only recycling said worker process when said number of times that said worker process has been recycled during said defined period of time is less than said threshold value further includes:
configuring said listener service to reject received requests for said worker process when said number of times that said worker process has been recycled during said defined period of time exceeds said threshold value.

34. The computer-readable medium as recited in claim 18, wherein configuring said administrative service to selectively recycle said worker process further includes:
configuring said administrative service to conduct a non-overlapping recycle of said worker process.

35. A system comprising:
one or more processors; and
memory in communication with the one or more processors, and comprising:
at least one user-mode worker process configured to handle web requests;
a kernel-mode listener service operatively coupled to said worker process and configurable to receive said web request from a client and provide said web request to said worker process; and
a user-mode administrative service operatively coupled to said at least one user-mode worker process and said kernel-mode listener service and configured to track a number of times that said worker process has been recycled during a defined period of time and determine when said worker process needs to be recycled and selectively conducting an overlapping recycle of said worker process when said worker process needs to be recycled but only when said number of times that said worker process has been recycled during said defined period of time is less than a threshold value.

36. The system as recited in claim 35, wherein said administrative service is configured to determine that said worker process is failing to operate properly.

37. The system as recited in claim 36, wherein said administrative service is configurable to receive a message from at least one user-mode process associated with said worker process to send, said message indicating a problem with said worker process.

38. The system as recited in claim 37, wherein said at least one user-mode process includes a process selected from a group of processes including said worker process, an in-process application, an out-of-process application, and an Internet Server Application Programming Interface (ISAPI) extension.

39. The system as recited in claim 36, wherein said administrative service is further configured to send a health status request message to said worker process, and determine that said worker process is failing to operate properly if said worker process fails to respond to said health status request message within a second defined period of time.

40. The system as recited in claim 39, wherein with said health status request message is configured to determine if there is at least one thread associated with said worker process available to accept a new request.

41. The system as recited in claim 36, wherein said administrative service is configured to determine that said worker process is failing to operate properly when an operating system informs said administrative service that a handle associated with said worker process has exited.

42. The system as recited in claim 35, wherein said administrative service is configured to determine that said worker process needs to be recycled based at least in part on an amount of time that said worker process has been operating.

43. The system as recited in claim 35, wherein said administrative service is configured to determine that said worker process needs to be recycled based at least in part on a recycle schedule.

44. The system as recited in claim 35, wherein:
said listener service is configured to tack a number of requests handled by said worker process; and
said administrative service is configured to determine that said worker process needs to be recycled based at least in part on said number of requests handled by said worker process.

45. The system as recited in claim 35, wherein said administrative service is configured to determine that said worker process needs to be recycled based at least in part on an amount of memory associated with said worker process.

46. The system as recited in claim 45, wherein said amount of memory associated with said worker process includes at least one type of memory selected from a group comprising a private memory associated with said worker process and a virtual memory associated with said worker process.

47. The system as recited in claim 35, wherein:

said listener service is configured to track a number of requests handled by said worker process over a second defined period of time; and said administrative service is configured to determine that said worker process needs to be recycled based at least in part on said number of requests handled by said worker process over said second defined period of time such that it is determined that said worker process is deemed to have been idle during said second defined period of time.

48. The system as recited in claim 35, wherein:

said listener service is configured to identify when there is a current demand for said worker process; and said administrative service is configured to only recycle said worker process when said listener service identifies said current demand for said worker process.

49. The system as recited in claim 35, wherein said listener service is configured to reject received requests for said worker process when said number of times that said worker process has been recycled during said defined period of time exceeds said threshold value.

50. The system as recited in claim 35, wherein said administrative service is configured to conduct a non-overlapping recycle of said worker process.

* * * * *